United States Patent [19]

Kumagai et al.

[11] Patent Number: 4,624,477
[45] Date of Patent: Nov. 25, 1986

[54] AUTOMOBILE SUSPENSION SYSTEM

[75] Inventors: Naotake Kumagai; Minoru Tatemoto; Shunzou Oshima; Mitsunori Maruyama, all of Okazaki; Shunichi Wada; Setsuhiro Shimomura, both of Himeji, all of Japan

[73] Assignees: Mitsubishi Jidosha Kogyo Kabushiki Kaisha; Mitsubishi Denki Kabushiki Kaisha, both of Tokyo, Japan

[21] Appl. No.: 713,756

[22] Filed: Mar. 20, 1985

[30] Foreign Application Priority Data

Mar. 27, 1984 [JP] Japan ................... 59-58768

[51] Int. Cl.[4] .............................................. B60G 17/00
[52] U.S. Cl. ................... 280/707; 280/6 R; 180/41
[58] Field of Search ............... 280/707, 6 R, 6.1, 6.11; 267/64.28; 180/41

[56] References Cited

U.S. PATENT DOCUMENTS 4,377,293 3/1983 Sendo .................................. 280/707
4,462,610 7/1984 Saito et al. ........................ 280/707
4,506,751 3/1985 Stephens ............................. 280/707

FOREIGN PATENT DOCUMENTS 59147107 11/1981 Japan .

Primary Examiner—Richard A. Bertsch
Attorney, Agent, or Firm—Leydig, Voit & Mayer, Ltd.

[57] ABSTRACT

A suspension system for an automobile wherein after having been changed to a "HARD" mode upon commencement of the turning movement, the characteristic of the suspension is not restored to the standard condition until completion of the turning movement is detected so that a stable running performance is obtained irrespective of the status of the curve of a road while good riding comfort at normal running is also maintained.

13 Claims, 8 Drawing Figures

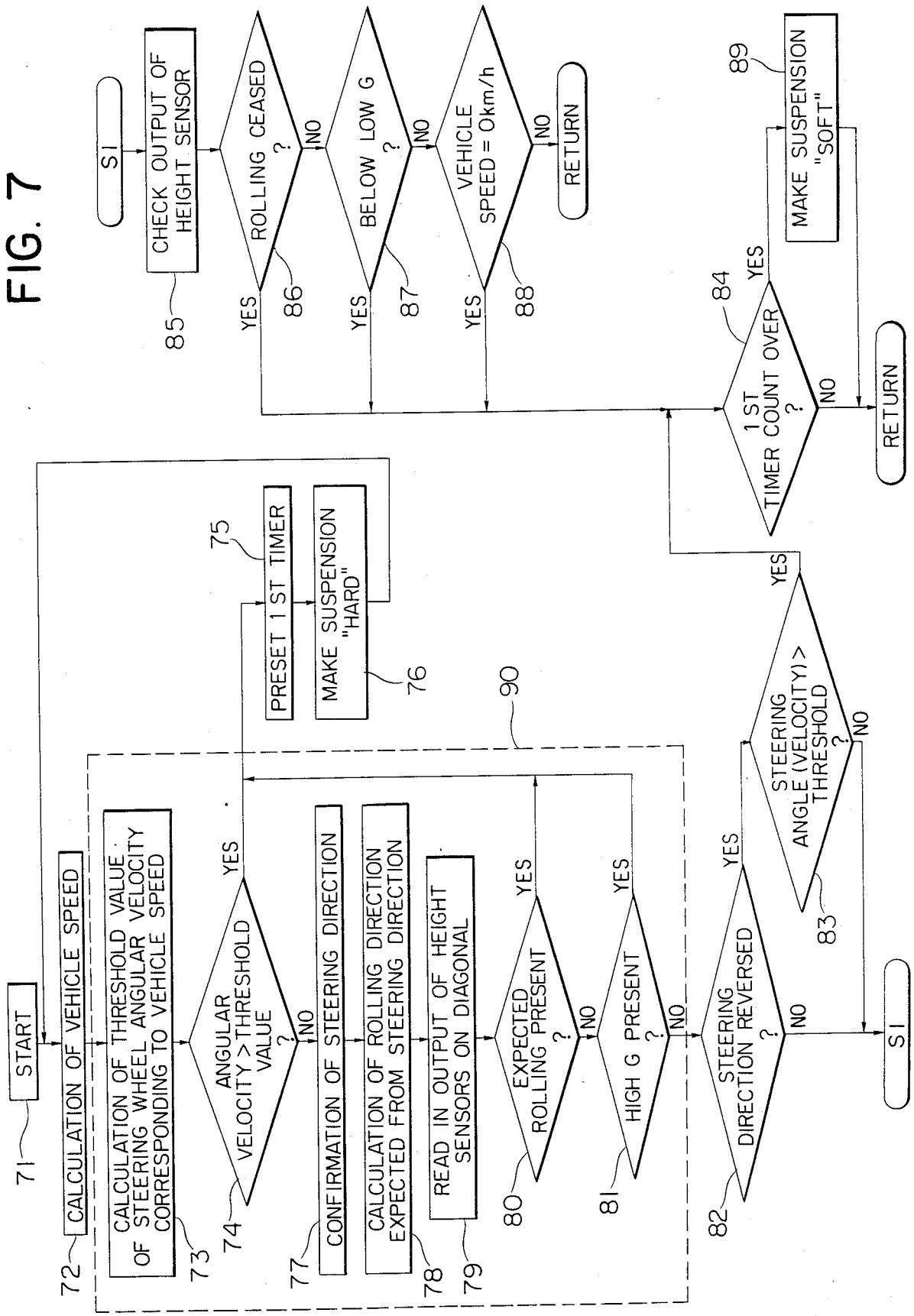

AUTOMOBILE SUSPENSION SYSTEM

BACKGROUND OF THE INVENTION

This invention relates to a suspension system for an automobile and, in particular, to a system for changing the damping force of shock absorbers of the suspension system or the characteristic of the suspension spring according to the turning condition of a vehicle.

Such a system has been proposed in Japanese Patent Application Laid-open No. 56-147107 in which the commencement of a vehicle's turning movement is determined from the speed and the angular velocity of the steering wheel, and the damping force of the suspension is changed to have a greater value than normal and then is restored to its standard value in a fixed time interval. While being very advantageous during a short time interval of the turning mode of operation or for a predetermined time interval from the commencement of turning movement, this turning detection system is disadvantageous in that the damping force is restored to the standard value in the course of turning for a long time interval. In a steering operation such as for making a sharp turn along a sharp curve in a road, the steering wheel must be rotated rapidly at the beginning of the sharp turn and remain at a fixed angle during a time interval when the vehicle follows the curve. On the other hand, at the end of the sharp turn when the vehicle tends to go straight, the steering wheel is rotated in a reverse direction with steering wheel angular velocity determined by the curvature of the road and the vehicle speed. Conventional systems such as disclosed in the above Japanese Patent application only consider the vehicle speed at commencement of the turning movement and the steering wheel angular velocity and, accordingly, can not determine a time interval for completion of the turning movement, resulting in the damping force being inaccurately adjusted.

SUMMARY OF THE INVENTION

It is, accordingly, an object of this invention to provide a suspension system for an automobile wherein, after having been changed to a "HARD" mode upon the commencement of the turning movement, the characteristic of the suspension is not restored to the standard condition until completion of the turning movement is detected so that a stable turning performance is obtained irrespective of the degree of curvature of a curve in a road to maintain a comfortable ride during the straight forward driving operation.

In order to accomplish this object, a suspension system for an automobile according to the present invention comprises a suspension having variable characteristics, a vehicle speed sensor means, herein shown as a speed sensor, for detecting the speed of the vehicle, a steering wheel sensor means, herein shown as a steering wheel sensor, for detecting the steering condition of the steering wheel, a vehicle's height sensor means, herein shown as a height sensor, for detecting a the height of the vehicle body relative to the wheel or the wheel axle and corresponding to a plurality of classified height ranges, and an acceleration sensor means, herein shown as an acceleration sensor, for detecting the acceleration of the vehicle so that the suspension characteristic may be changed according to certain operating conditions of the vehicle the system further provides a first means for detecting commencement of the turning movement of the vehicle on the basis of at least one of the output signals from the vehicle speed sensor, the steering wheel sensor, the vehicle height sensor, and the acceleration sensor to change the suspension characteristic to a first desirable value so that the suspension characteristics may be disposed in a hard condition, and a second means for detecting completion of the turning movement of the vehicle on the basis of at least one of the output signals of the vehicle speed sensor, the steering wheel angle sensor, the vehicle height sensor, and the acceleration sensor to change the suspension characteristic to a second desirable value so that the suspension characteristic may be disposed in a soft condition. Preferably, the suspension has shock absorbers with a damping force which can be changed, has springs with a spring rate which can be changed, or shock absorbers with a damping force which can be changed, and springs with a spring rate which can be changed.

The first means preferably comprises means for detecting commencement of the turning movement on the basis of the vehicle's speed provided by the vehicle speed sensor and the angular velocity or a angle of the steering wheel, or a steering direction provided by the steering wheel sensor to change the suspension characteristic to the first desirable value. The acceleration sensor is capable of detecting accelerations at two or more points in the same direction, and the first means comprises means for detecting commencement of the turning movement on the basis of the output signal from the acceleration sensor indicating a higher acceleration to change the suspension characteristic to the first desirable value. The vehicle height sensor consists of two sensors disposed in a diagonal line to the front and the rear wheels, and the first means comprises means for detecting commencement of the turning movement on the basis of a steering direction or a steering wheel angle provided by the steering wheel sensor and the information provided by the vehicle height sensor to change the suspension characteristic to the first desirable value.

The second means preferably comprises means for detecting completion of the turning movement on the basis of vehicle speed provided by the vehicle speed sensor and a steering direction, aa steering wheel angular velocity or a steering wheel angle provided by the steering wheel angle sensor to change the suspension characteristic to the second desirable value. The acceleration sensor is capable of detecting two or more acceleration rates in the same direction, and the second means comprises means for detecting completion of the turning movement on the basis of the output signal of the acceleration sensor indicative of a lower acceleration to change the suspension characteristic to the second desirable value. The vehicle height sensor consists of two sensors disposed on the diagonal line of the front and the rear wheels, and the second means comprises means for detecting completion of the turning movement on the basis of vehicle speed provided by the vehicle speed sensor, a steering direction or a steering wheel angle provided by the steering wheel angle sensor and the information provided by the sensors of the vehicle height sensor to change the suspension characteristic to the second desirable value. The second means comprises means for determining completion of the turning movement when the vehicle speed is lower than a prescribed value.

This suspension system for an automobile further comprises a third means of retaining the suspension characteristic at a desirable value for a predetermined time interval when the time interval from the detection of commencement of the turning movement to the detection of completion of the turning movement is shorter than the predetermined time interval. The predetermined time interval may be variable according to the output signals from the sensors indicative of the operating condition of the vehicle.

BRIEF DESCRIPTION OF THE DRAWINGS

FIG. 7 shows a flow chart of the operation executed by a control unit of the embodiment of this invention.

Throughout the figures, the same reference numerals designate identical or corresponding portions.

DETAILED DESCRIPTION OF THE PREFERRED EMBODIMENT

Figure 1:
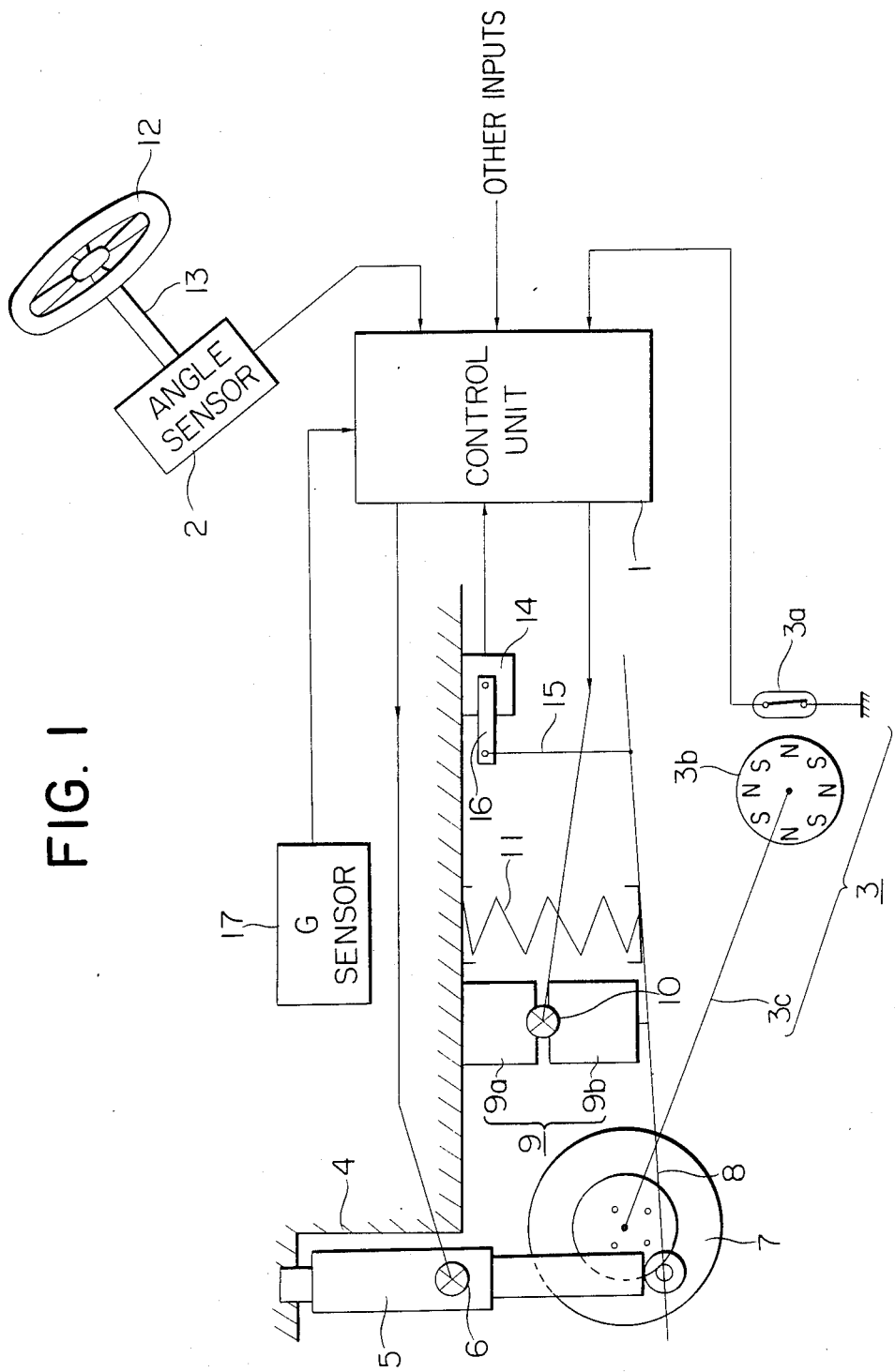
FIG. 1 shows a basic arrangement of one embodiment of a suspension system for an automobile according to the present invention.

FIG. 1 shows a schematic diagram of one embodiment of a suspension system for an automobile according to the present invention in which a control unit 1 receives as input information the output signals of a steering wheel angle sensor 2, a vehicle speed sensor 3, an acceleration sensor 17 to control a variable orifice 6 in a shock absorber 5 interconnecting a vehicle body 4 with a vehicle wheel 7 and to control an interconnecting path 10 of an air spring 9 which consists of spring chambers 9a and 9b. The opening of the interconnecting path 10 interconnects the chambers 9a and 9b to render the spring constant small, i.e,. to render the spring 9 "soft". On the other hand, the closing of the interconnecting path 10 separates the chambers 9a and 9b to render the spring constant large, i.e., to render the spring "hard". The air spring 9 is connected in parallel with an auxiliary spring 11.

The diameter of the variable orifice 6, through which oil within the shock absorber 5 passes, may be changed by an actuator (not shown) from a large value to a small value and vice versa. When the orifice diameter is large, the damping factor of the shock absorber 5 decreases while when the diameter of the orifice is small, the damping factor increases.

The rotation of the vehicle wheel 7 is transmitted through a wire 3c to the speed sensor 3 whereby a magnet 3b is rotated accordingly. The rotation of the magnet 3b switches a lead switch 3a on/off which then generates a pulse signal for the calculation of the vehicle speed.

A vehicle height sensor 14 detects and measures the variation of the vehicle height of the vehicle body 4 transmitted through a rod arm 8, a rod 15, and a sensor arm 16 interconnected with each other as shown in FIG. 1.

Figure 2A:
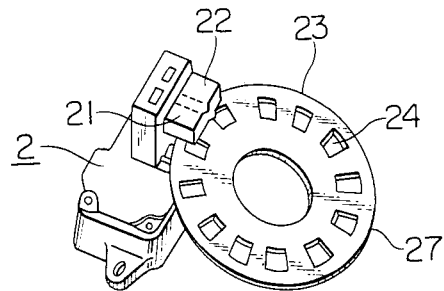
FIGS. 2A and 2B show a perspective view of a steering wheel angle sensor used in FIG. 1.
Figure 2B:
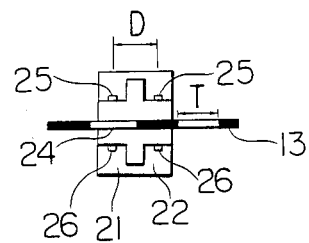

FIGS. 2A and 2B show an arrangement of the steering wheel angle sensor 2. FIG. 2A shows a perspective view and FIG. 2B shows a front view illustrating the relationship of light switches 21, 22 and a circular slit plate 27 having a plurality of slits or apertures 24 circumferentially formed therethrough. The light switches 21 and 22, respectively, comprise a set of a photo-transistor 25 and an LED 26, each set forming a light switch, herein referred to as a photo-interrupter. With the slit plate 27 being rotated due to the steering operation of the steering wheel of the car, the plate 27 traverses the light switches, whereby the light switch 21 or 22 is switched on while an aperture 24 of the plate 27 passes under the light switch 21 or 22 and is switched off while a mask portion 23 of the slit plate 27 between the apertures 24 passes under the light switch 21 or 22 to cause photo-interruption of the respective light sources. The plate 27 is mounted on a shaft 13 of a steering wheel 12 so as to rotate according to the rotation of the steering wheel 12. If the relationship between a lateral width T of the mask portion 23 or the aperture 24 in the slit plate 27 and the distance D of the transistors 25 is set so that $3/2T = D$ holds, the output pulse signals of the two light switches 21 and 22 will be mutually different in electrical angle by 90°.

Figure 3:
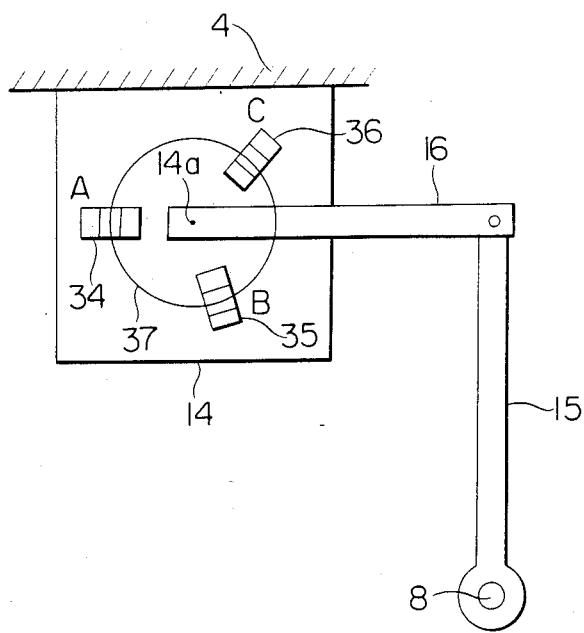
FIG. 3 shows an arrangement of a vehicle height sensor used in FIG. 1.

FIG. 3 shows an arrangement of the vehicle height sensor 14 in which the rod 15 connects to the vehicle wheel 7 through the arm 8 and an arm 16, connecting the arm 15 and the sensor 14, rotates about point 14a depending on the variation of the vehicle height. The rotation of the arm 16 causes a slit plate 37 connected to the arm 16 to rotate. Light switches 34, 35, and 36, each formed of the photo-interrupter, provide as outputs therefrom on/off signals in accordance with a pattern of photo passage or photo interruption generated by the rotation of the slit plate 37. In this embodiment, a 3-bit code signal is provided as an output from terminals A, B, and C whereby the variation of the vehicle's height in the range of $2^3 = 8$ can be detected.

Figure 4:
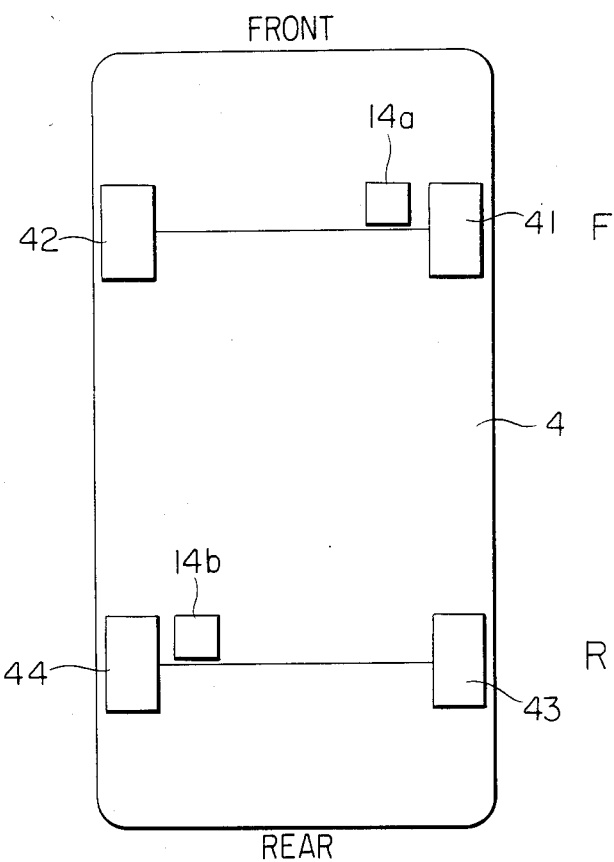
FIG. 4 shows a layout of the vehicle sensors used in FIG. 1.

The vehicle height sensors 14a and 14b mounted on the vehicle body 4 are shown in FIG. 4 together with vehicle wheels 41, 42, 43, and 44. With the sensors 14a and 14b mounted symmetrically in relation to the front and the rear wheels, not only variations in the front and rear height but also the presence of a body rolling in the lateral direction as well as a body pitching in the longitudinal direction can be detected simultaneously. It is obvious that, if four vehicle height sensors are respectively mounted on the four wheels, a more precise height information will be obtained compared with the two sensors illustrated.

One embodiment of calculating vehicle speed from the output of the vehicle speed sensor 3 in the suspension system thus arranged will now be described.

Figure 5:
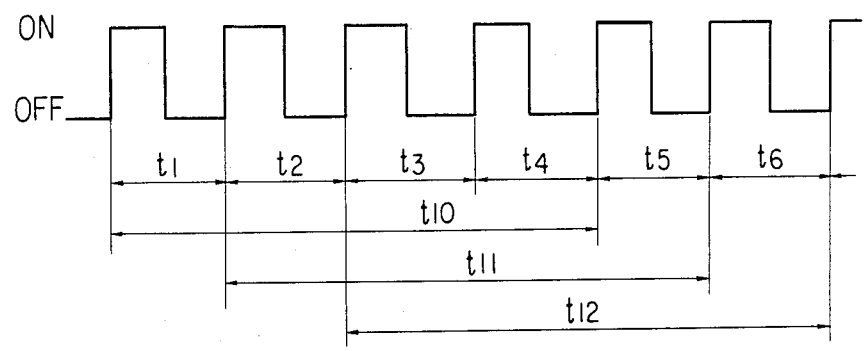
FIG. 5 shows a waveform diagram for explaining the processing of a vehicle speed signal obtained in the embodiment of this invention.

FIG. 5 shows an output waveform of the vehicle speed sensor 3. The on/off output signal of the lead switch 3a which is waveform-shaped so as to filter chattering noises etcetera, therefrom, has the following characteristic. First of all, if a component of the magnet 3b due to a manufacturing precision requirement such as eccentricity, requires the use of four pulses per one rotation, as in this embodiment, an error in each period of t1, t2, t3, and t4 may occur. Secondly, a second component is introduced due to rotational variations by the wire 3c as a function of time which gives rise to fluctuations in the generated pulse periods t1, t2, t3, ---, tn.

Meanwhile, these pulses, even when including errors or fluctuation, still provide exact rotational speed information per one rotation of the wire 3a or of the magnet 3b because of the cause of the occurrences. Accordingly, in FIG. 5, even though t1 is not equal to t2 which is not equal to t3 which is not equal to t4, t1 is nearly equal to t5, t2 is nearly equal to t6, and tn is equal to tn+4 so that t10 is nearly equal to t11 which is nearly equal to t12.

Accordingly, the optimum method of calculating vehicle speed with accuracy and good responsiveness is to determine t10, t11, and t13 and then to calculate the vehicle speed from their inverse numbers. Alternatively, it is also possible to memorize t1, t2, t3 and t4, then to determine their average value, and then to determine the vehicle speed from the average value. Next, the average value of t2, t3, t4 and t5 are determined whereby the vehicle speed is determined from the average value. Thus, by the sequential determination of the moving average values for the interval of t10, t11, t12, etc., vehicle vehicle speed during those intervals can be determined. This method realizes the calculation and determination of vehicle speed with accuracy and good responsiveness. Such an averaging process calculation may readily be realized by employing a micro-computer as the control unit 1 by counting the periods of t1, t2, ---, tn each time an edge of a pulse is inputed, and by storing in a memory the periods t1, t2, ---, tn. Calculation of the vehicle's speed, per se, must not necessarily be determined per one cycle of rotation but the average value of the periods for a number of cycles may be used for the various determinations, the coordinates of a map for the determinations, and the coordinates of the interpolation calculation for the map for the various determinations in this invention.

Figure 6:
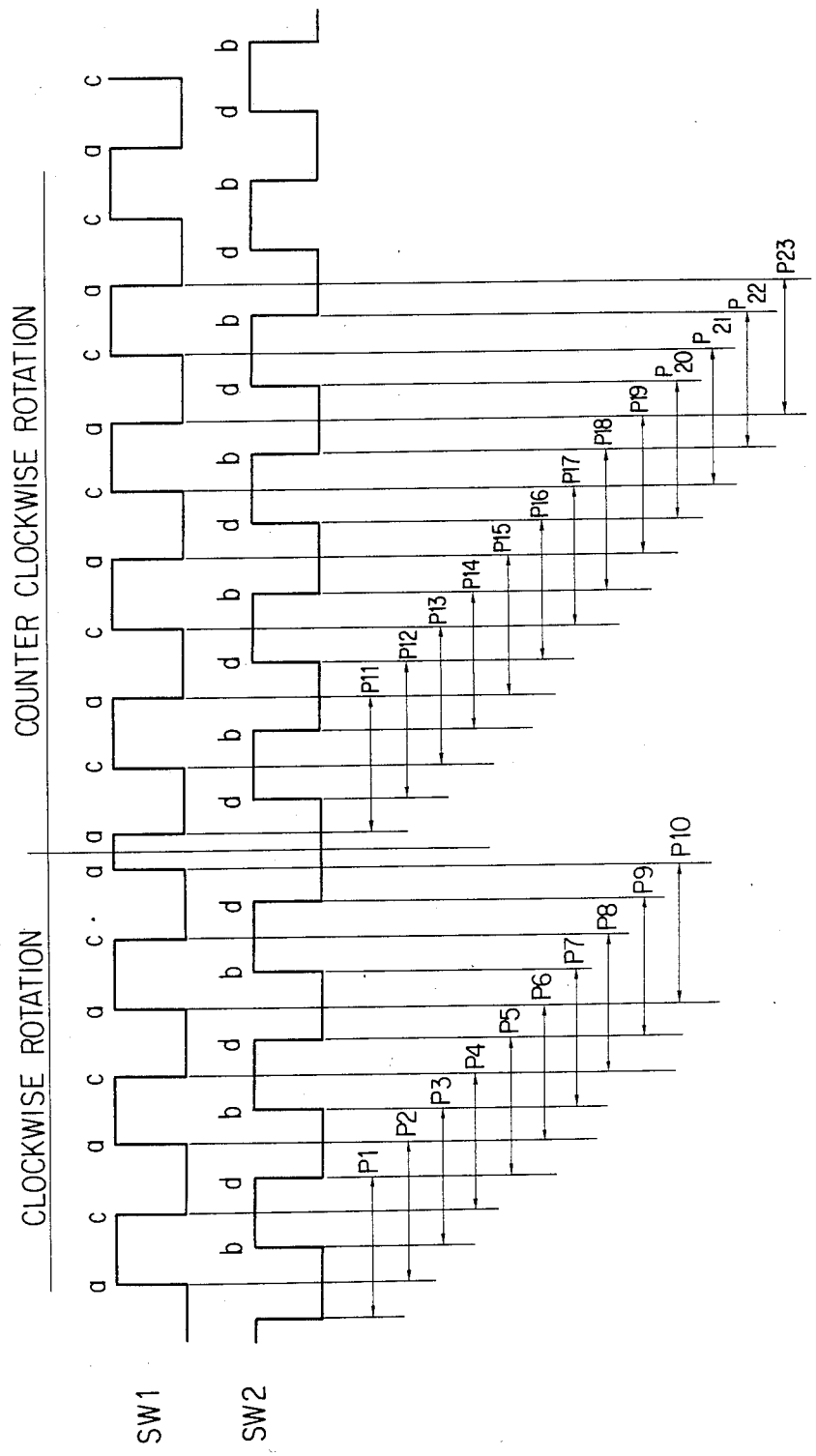
FIG. 6 shows waveform diagrams for explaining the processing of the output signal of a steering wheel angle sensor used in FIG. 1.

FIG. 6 shows waveforms SW1 and SW2 detected by the steering wheel angle sensor 2 shown in FIGS. 1 and 2. The waveforms SW1 and SW2 are respectively provided as output pulse signals from the light switches 21 and 22 of the sensor 2 at a rate of one pulse each time the steering wheel 12 is rotated by 30°, and have output pulse edges of a-c-a-c and b-d-b-d, respectively, when the steering wheel is rotated in the clockwise (C.W.) direction. It is to be noted that the period of these pulses corresonds to the rotating speed of the steering wheel 12. The time chart shown in FIG. 6 illustrates the case where the steering wheel is initially rotated in the clockwise direction at a uniform rate after which it is rotated in a counterclockwise (C.C.W.) direction at a uniform rate just after a pulse edge "a" of SW1 has risen. In the case of the C.W. rotation, by monitoring the order in which the pulse edges are generated, i.e., a-b-c-d for C.W. rotation and a-d-c-b for C.C.W. rotation, a change in the of direction rotation can be detected. Furthermore, by measuring the intervals of the pulse edges from one pulse edge "a" to the next pulse edge "a", from one pulse edge "b" to the next pulse edge "b" and so on during the periods P1, P2, P3, P4, ---and so on as shown in FIG. 6, the variation of the steering wheel angular velocity can be continuously measured, and by integrating the angle of 30°/4 per inter-pulse edges of a-b, b-c, and so on during the forward rotation, the total steering wheel angle can be detected.

When the rotating direction of the steering wheel 12 is reversed from the C.W. direction to the C.C.W. direction, the respective change in the order of pulse edge generation from a-b-c-d to a-d-c-b is detected, thereby enabling to determination of the direction of steering as well as the steering wheel angular velocity as derived from the edge intervals and the total steering wheel angle.

Specifically, by detecting that the order in which the pulse edges are generated is a-d-c-b-a, it can be determined that steering wheel rotation is C.C.W., and by calculating the steering wheel angular velocity or the total steering wheel angle from the periods of P11, P12, P13, P14 and so on as shown in FIG. 6, it is possible to detect the steering wheel angular velocity and the steering wheel angle, per se, in the C.C.W. rotation as in the C.W. rotation.

Such a detection method and a calculation can be readily realized by employing a micro-computer, by counting the periods of the pulse edge intervals each time edges of pulses of SW1 and SW2 are inputed to the micro-computer, and by counting the passing frequency of the pulse edges and storing same in a memory.

Thus, since the steering wheel angular velocity and the total steering wheel angle can be updated every 30°/4, i.e., during the period P1, then the period P2, then the period P3, and so on in this embodiment, a highly accurate detection of the steering wheel angle having a good response can be achieved.

It is to be noted that, while this embodiment has been described with the steering wheel angle sensor 2 providing, as an output therefrom, one pulse each time the steering wheel is rotated by 30°, such a steering wheel sensor may be of a type which issues one pulse per any number of degrees or may be an analog type which is also capable of detecting the direction of rotation.

It is also to be noted that the acceleration sensor 17 may be of the type which provides, as an output therefrom, an analog signal representative of the acceleration of a vehicle in the lateral direction thereof or may be of the type which only indicates the presence or absence of the acceleration above a predetermined threshold value in the form of a code "1" or "0", respectively.

The operation of the suspension system for an automobile thus arranged will now be described with reference to FIG. 7 showing a program flow chart stored in a memory of a micro-computer forming the control unit 1 of the embodiment of this invention in FIG. 1. The main routine of the electronic controlled suspension is started at Step 71. At Step 72, the present vehicle speed is calculated from the output of the vehicle speed sensor 3 using the calculation method described with reference to FIG. 5, namely, the average value of the periods of the vehicle speed pulses is determined and, from this average value, the vehicle speed is determined. At Step 73, a threshold value based on the steering wheel angular velocity and vehicle speed as calculated at Step 72 is calculated. This threshold value is selected such that the steering wheel angle can be judged to be a sharp steering operation for a low vehicle speed as well as for a slow steering operation, to some extent, for a high vehicle speed. At Step 74, a comparison is made between the above threshold value (judging value) of the steering wheel angular velocity and the present steering wheel angular velocity, and if the steering wheel angular velocity is larger than the threshold value, indicating that the vehicle begins to turn sharply, the program proceeds to Step 75 whereby operations for changing the suspension to the "HARD" mode will be executed namely, at Step 75, an initial value is set in a first timer (not shown) but included in the control unit 1 which is supposed to count down per a predetermined time interval and to be clipped at zero count by a timer routine (not shown). For example, if a count value corresponding to 2 seconds is set in the timer, the timer is counted down per, e.g., 10 ms whereby the count value becomes zero in 2 seconds at which time it is determined as "count-over". At Step 76, the suspension is made "HARD" and then the program returns to the start at Step 71.

It is to be noted that since conventional electronic controlled suspension systems make the judgment of commencement of a turning movement based only on the above steps, the suspension characteristic at the time of going into the turning mode is made "HARD", after which it will be necessarily restored to "SOFT" when the first timer has completed its count regardless of the duration of the turning movement.

However, in this invention, even though the answer condition at Step 74 is not "yes", the "HARD" mode is retained until judgment of the completion of the turning movement according to Step 82 and the following steps has been made, resulting in the elimination of the disadvantage of restoring to the "SOFT" mode in the course of the turning operation.

There is an additional method of judging the commencement of the turning movement following the method described referring to Step 74, a will be described in the following embodiment.

At Step 77, the steering direction is confirmed, and at Step 78 the rolling direction which is expected from the steerng direction is calculated. At Step 79, the outputs or the average value of the outputs of the vehicle height sensors 14 mounted on four wheels or only the front and rear wheels on the diagonal line is confirmed. For example, in the case of a right turning movement, the vehicle is rolled in the left-hand direction. In this case, the height of the vehicle's right front wheel is extended while the height of the vehicle's left rear wheels is reduced so that the outputs of the vehicle height sensors 14 are mutually displaced in the opposite directions. Therefore, it is judged that if the outputs of the vehicle height sensors 14 on the diagonal line or the average values thereof have a variation in the opposite directions and indicate the same rolling direction as that expected from the steering direction determined from the steering wheel angle sensor 2, the turning movement has commenced. If it is judged at Step 80 that the vehicle is rolling in the expected direction, the program proceeds to Step 75 in which the suspension characteristic is made "HARD" as mentioned above. Otherwise, the program goes to the next Step 81.

There is an additional method of judging the commencement of the turning movement, as will be described hereinbelow. The acceleration sensor 17 is used to detect the acceleration of the vehicle in the lateral direction, whereby when an acceleration value G exceeds a first (higher) prescribed value, the commencement of the turning movement is judged. For this purpose, at Step 81 it is determined whether or not the higher prescribed value G is exceeded, and if it is exceeded, then it is judged that the turning movement has commenced whereby the program proceeds to Step 75 where the control unit 1 causes the suspension characteristic to change to "HARD" as above noted. Otherwise, the program proceeds to the next Step 82.

Thus, at Steps 73–81 which will be together referred to as Step 90 enclosed by a dotted line, if any of the above conditions on commencement of the turning movement is met, the first timer is preset at Step 75 and the suspension characteristic is made "HARD". Also, if any of the conditions is met continuously, then the first timer is always preset to change the spring characteristic and the damping force of the suspension into the "HARD" mode. If not met continuously, the first timer will not be preset, the first timer is counted down per a predetermined time interval and counted down to zero when a prescribed time interval has lapsed, thereby being clipped, as mentioned before. Of course, if none of the above conditions is met, the suspension characteristic is maintained "SOFT" and the timer remains reset at a zero count.

Next, an embodiment of a judging method of completion of the turning movement will be described.

If commencement of the turning movement has already been determined by the steering wheel angular velocity or by the rolling direction coincident with the steering direction, the steering direction which has caused the commencement of the turning movement can be stored in the memory. On the basis of this stored steering direction, the present steering direction is confirmed. Namely it is confirmed at Step 82 whether the present steering direction has reversed. If it is determined that the steering direction has not reversed, the program proceeds to Step S1. In this case, it is determined that the turning mode has not been completed. If reversed, it is confirmed at Step 83 whether the steering wheel has been returned by a predetermined angle or more in the reverse direction, or whether the steering wheel has been returned at a predetermined rate or more in the reverse direction. If either one or both conditions are met, it is determined that the turning movement has been completed, and at Step 84 it is checked whether the first timer has counted over. If "yes", the suspension characteristic is restored to "SOFT" at Step 89 and then the program returns to Step 71. If none of the above mentioned conditions are met, it is deemed during the turning movement that the conditions are still being checked while it is deemed outside of the turning movement that the conditions remain unchanged and the program proceeds to the predetermined step.

Another method of determining completion of the turning movement will be described hereinbelow.

If the outputs of the vehicle height sensor 14 mounted on the diagonal line of the front and rear wheels or the average values thereof coincide with each other, it indicates that the vehicle rolling, due to the turning movement has ceased, so that it can be determined that the turning movement has been completed. At Step 85, the outputs of the sensors 14 or the average values thereof are read in, and if it is determined at Step 86 that the outputs of the sensors 14 do not coincide with each other, indicating that the rolling has not ceased, the program proceeds to the next step with the suspension characteristic being maintained "HARD". If it is determined that the outputs of the sensors 14 coincide with each other, indicating that the rolling has ceased, the turning mode is determined to be completed and the program proceeds to Step 84. Step 84 and the following steps are as mentioned above.

A still further method of determining completion of the turning movement will be described.

It is checked at Step 87 whether the G value of the vehicle is smaller than a second prescribed G value which is lower by a desired value than the first prescribed value used for the determination of the commencement of the turning movement. If the former is found to be smaller than the latter, it is determined that the turning movement has been completed, and the program proceeds to Step 84. Otherwise, the program proceeds to the next step 88. It is to be noted that the determination of the first and second prescribed G values can be made by using multi-determination points in the case of an analog type G sensor and that, also in the case of a G sensor of a single output type (0,1), the hysterisis may be set to a desired value such that a point at which the output of the G sensor is turned on corresponds to the first prescribed G value and a point at which the output of the G sensor is turned off corresponds to the second prescribed G value.

Next, still additional methods of determining completion of the turning movement will be described hereinbelow.

At Step 88, if it is determined that the vehicle speed has become lower than the prescribed value, for example, the vehicle has stopped, then it may be considered that turning movement or the rolling due to the turning has been completed, and therefore, the program proceeds to Step 84. Otherwise, the program returns to Step 71 or "start".

The effect of the first timer will now be described.

In such a case where the vehicle runs on a road in a slalom fashion and the suspension characteristic is repeatedly changed over between the "HARD" and "SOFT" modes in short time intervals, it is desirable that the suspension characteristic remains "HARD" continuously, in which case it is not necessary to consider the durability of the change-over mechanism. Therefore, the suspension characteristic is not changed to the "SOFT" mode until the first timer is counted over even if the determination of completion of the turning movement has been made. Also, if the setting time of the first timer is modified to a programmed desirable value according to information from various sensors indicative of the operating condition of a vehicle such as vehicle information of the vehicle height sensor, G information of the acceleration sensor, gear position information of the transmission, braking information, and information of a throttle opening sensor, the change-over timing between the "HARD" and the "SOFT" modes and the change-over frequency can be programmed in the optimum condition, advantageously resulting in a comfortable and durable suspension.

It is to be noted that, while in the flow chart shown in FIG. 7, all of determinations of the commencement and completion of turning movement have been described according to the OR operation, any one or any combination of the above described conditions may be utilized.

As above described, in the suspension system of an automobile of this invention in which the commencement of the turning movement is determined by a turning commencement determining means to change the suspension characteristic to the "HARD" mode and completion of the turning movement is determined by a turning completion determining means to change the suspension characteristic to the "SOFT" mode, a stable running performance is available regardless of the status of the curve of road while a riding comfort in a normal running condition is compatibly available.

Also according to this invention, with a simple arrangement in which the "HARD" mode is retained, if a time interval from the determination of commencement of the turning movement to the determination of completion of the turning movement is shorter than a predetermined time interval which is changeable according to various information indicative of the operating condition of the vehicle, a stable running performance is available regardless of the status of the curve of a road, and unnecessary excessive changes between the "HARD" and the "SOFT" modes can be advantageously precluded.

It is to be noted that while this invention has been described with reference to the above embodiments, this invention is not limited to those embodiments but various modifications of this invention are possible without departing from the spirit of this invention.

What we claim is:

1. A suspension system for an automobile comprising a suspension having variable characteristics changeable according to an operating condition of the vehicle, and at least one of a vehicle speed sensor means for detecting the speed of the vehicle, a steering wheel sensor means for detecting the steering condition of the vehicle's steering wheel, a vehicle height sensor means for detecting the height of the vehicle body relative to the vehicle wheel or the vehicle wheel axle and corresponding to a plurality of classified height ranges, and an acceleration sensor means for detecting the acceleration of the vehicle; said system further comprising:

a first means for detecting commencement of the turning movement of the vehicle on the basis of at least one of the output signals from said vehicle speed sensor means, said steering wheel sensor means, said vehicle height sensor means, and said acceleration sensor means, and for changing the suspension characteristic to a first value representing a hard condition; and a second means for detecting completion of the turning movement of the vehicle on the basis of at least one of the output signals from said vehicle speed sensor means, said steering wheel sensor means, said vehicle height sensor means, and said acceleration sensor means, and for changing the suspension characteristic to a second value representing a soft condition.

2. A suspension system for an automobile as claimed in claim 1 wherein said first means comprises means for detecting commencement of the turning movement on the basis of the vehicle speed provided by said vehicle speed sensor means and on the basis of at least one of the steering wheel angular velocity, a steering wheel angle and a steering direction provided by said steering wheel sensor means to change the suspension characteristic to the first value.

3. A suspension system for an automobile as claimed in claim 1 wherein said acceleration sensor means is capable of detecting two or more accelerations in the same direction, and wherein said first means comprises means for detecting commencement of the turning movement on the basis of the output signal from said acceleration sensor means indicative of a higher acceleration to change the suspension characteristc to the first value.

4. A suspension system for an automobile as claimed in claim 1 wherein said vehicle height sensor means includes two sensors disposed in a diagonal line to the front and the rear wheels, and wherein said first means comprises means for detecting the commencement of the turning movement on the basis of at least one of a steering direction and a steering wheel angle provided by said steering wheel sensor means and the information provided by the sensors of said vehicle height sensor means to change the suspension characteristic to the first value.

5. A suspension system for an automobile as claimed in any one of claims 1 to 4 wherein said second means comprises means for detecting completion of the turning movement on the basis of a vehicle speed provided by said vehicle speed sensor means and on the basis of at least one of a steering direction, a steering wheel angular velocity and a steering wheel angle provided by said steering wheel sensor means to change the suspension characteristic to the second value.

6. A suspension system for an automobile as claimed in any one of claims 1 to 4 wherein said acceleration sensor means is capable of detecting acceleration at two or more accelerations in the same direction, and wherein said second means comprises means for detecting completion of the turning movement on the basis of the output signal of said acceleration sensor means indicative of a lower acceleration to change the suspension characteristic to the second value.

7. A suspension system for an automobile as claimed in any one of claims 1 to 4 wherein said vehicle height sensor means includes two sensors disposed on the diagonal line of the front and the rear wheels, and wherein said second means comprises means for detecting completion of the turning movement on the basis of a vehicle speed provided by said vehicle speed sensor means, and on the basis of at least one of a steering direction, a steering wheel angle provided by said steering wheel angle sensor means and the information provided by the sensors of said vehicle height sensor means to change the suspension characteristic to the second value.

8. A suspension system for an automobile as claimed in claim 1 wherein said second means comprises means for determining completion of the turning movement when the vehicle speed is lower than a prescribed value.

9. A suspension system for an automobile as claimed in claim 1 further comprising a third means for retaining the suspension characteristic at a desirable value for a predetermined time interval determined when the time interval from the detection of commencement of the turning movement to the detection of completion of the turning movement is shorter than said predetermined time interval.

10. A suspension system for an automobile as claimed in claim 9 wherein said predetermined time interval is variable according to the output signals from said sensor means indicative of the operating condition of the vehicle.

11. A suspension system for an automobile as claimed in claim 1 wherein said suspension has shock absorbers with an adjustable damping force.

12. A suspension system for an automobile as claimed in claim 1 wherein said suspension has springs with an adjustable spring rate.

13. A suspension system for an automobile as claimed in claim 1 wherein said suspension has shock absorbers with an adjustable damping force and springs with an adjustable spring rate.

* * * * *